(12) United States Patent
Han et al.

(10) Patent No.: US 9,235,107 B2
(45) Date of Patent: Jan. 12, 2016

(54) CAMERA MODULE AND METHOD FOR ASSEMBLING THE SAME

(75) Inventors: Sangyeal Han, Seoul (KR); Sukwoo Son, Seoul (KR); Daeseung Kim, Seoul (KR); Heungsun Kim, Seoul (KR); Bumsig Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 4 days.

(21) Appl. No.: 14/123,834

(22) PCT Filed: Jun. 7, 2012

(86) PCT No.: PCT/KR2012/004478
§ 371 (c)(1),
(2), (4) Date: Dec. 4, 2013

(87) PCT Pub. No.: WO2012/169787
PCT Pub. Date: Dec. 13, 2012

(65) Prior Publication Data
US 2014/0212121 A1    Jul. 31, 2014

(30) Foreign Application Priority Data
Jun. 7, 2011  (KR) .................. 10-2011-0054475

(51) Int. Cl.
*G03B 17/12* (2006.01)
*G02B 7/02* (2006.01)

(52) U.S. Cl.
CPC *G03B 17/12* (2013.01); *G02B 7/02* (2013.01); *Y10T 29/49826* (2015.01)

(58) Field of Classification Search
USPC ........................................ 396/439
See application file for complete search history.

(56) References Cited

U.S. PATENT DOCUMENTS

| 6,310,735 | B1 * | 10/2001 | Best et al. ................ 359/819 |
| 8,123,420 | B2 * | 2/2012 | Gottwald et al. ........... 396/529 |
| 2004/0184165 | A1 * | 9/2004 | Hama et al. ............... 359/820 |
| 2005/0271375 | A1 * | 12/2005 | Watanabe et al. .......... 396/144 |
| 2009/0225455 | A1 | 9/2009 | Kawasaki et al. |
| 2011/0119801 | A1 * | 5/2011 | Wright ....................... 2/8.2 |
| 2012/0019905 | A1 * | 1/2012 | Teraoka et al. ............. 359/356 |
| 2012/0275025 | A1 * | 11/2012 | Parrill ....................... 359/511 |

FOREIGN PATENT DOCUMENTS

| JP | 2009-053528 A | 3/2009 |
| JP | 2009053528 A * | 3/2009 |
| JP | 2009-216774 A | 9/2009 |
| KR | 10-2004-0085693 A | 10/2004 |
| KR | 10-0836134 B1 | 6/2008 |

OTHER PUBLICATIONS

KR 10-2003-0020483, Lee et al.*

* cited by examiner

*Primary Examiner* — Clayton E Laballe
*Assistant Examiner* — Linda B Smith
(74) *Attorney, Agent, or Firm* — Birch, Stewart, Kolasch & Birch, LLP

(57) ABSTRACT

Disclosed are a camera module and a method for assembling the camera module, the camera module including a cover part having an opening formed therein and a lens guide formed in the opening to prevent removal of a lens to an outside, a lens mounted to the opening of the cover part, and a back cap coming into close contact with the lens and mounted to the opening.

17 Claims, 2 Drawing Sheets

CAMERA MODULE AND METHOD FOR ASSEMBLING THE SAME

TECHNICAL FIELD

The present invention relates to a camera module and a method for assembling the camera module.

BACKGROUND ART

As various kinds of portable terminals have been widely popularized with the public and wireless interne service becomes commonly available, consumer demands for the portable terminals become diversified. Thereby, various kinds of peripheral devices have been applied to the portable terminals.

Further, development of information and communication technology enhances improvement on data communication speed or expands data traffic. Currently, a mobile electronic device including a mobile phone or a notebook computer is equipped with an image capturing device such as a CCD image sensor or a CMOS image sensor.

Such an image capturing device takes a subject in a form of a photograph or a video, stores an image data associated with the subject, and then edits or transmits the data if necessary. A modularized camera module becomes commercially available.

DISCLOSURE OF INVENTION

Technical Problem

Accordingly, the present invention provides a camera module and method capable of simplifying an assembly process and reducing the number of parts.

Solution to Problem

In one general aspect of the present invention, there is provided a camera module, the camera module comprising: a cover part having an opening formed therein, and a lens guide formed in the opening to prevent removal of a lens to an outside; a lens mounted to the opening of the cover part; and a back cap coming into close contact with the lens and mounted to the opening.

Preferably, the lens guide is integrated with the cover part into a single structure.

Preferably, an O-ring is interposed between the lens and the cover part.

Preferably, the back cap is fixed to the cover part.

Preferably, one side of the lens is in close contact with the lens guide, and the other side of the lens is in close contact with the back cap.

The camera module further includes a protrusion provided on the lens guide to protrude toward the lens.

Preferably, an O-ring is mounted between the protrusion of the lens guide and the opening.

Preferably, a stepped portion is formed on an edge of an object-side of the lens, and the protrusion is in close contact with the stepped portion, so that the lens comes into close contact with the lens guide.

Preferably, a first stepped portion is formed in the opening of the cover part, and a second stepped portion is formed on an outer circumference of the back cap, so that when the back cap is mounted to the opening, the first stepped portion is engaged with the second stepped portion.

Preferably, a recess is formed in the cover part, the opening is formed inside the recess, and cover-part coupling portions are formed on the outer circumference of the back cap to be engaged with the recess and the opening of the cover part.

Preferably, a width of the opening is narrower than a width of the recess.

Preferably, the lens includes a projecting portion, and the back cap includes a depression to be engaged with the projecting portion, so that when the back cap is mounted to the opening of the cover part, the projecting portion of the lens is inserted into the depression of the back cap.

Preferably, a through hole is formed in the depression of the back cap to allow light of a subject to pass therethrough.

Preferably, the back cap is fastened to the cover part in a threaded manner.

In another general aspect of the present invention, there is provided a method for assembling a camera module, the method comprising: preparing a cover part, the cover part including an opening, a lens guide formed in the opening to prevent removal of a lens to an outside, a protrusion provided on the lens guide to come into close contact with the lens, and a groove formed between the protrusion of the lens guide and the cover part; fitting an O-ring into the groove; mounting the lens to the opening so that the lens comes into close contact with the O-ring; and fixing the back cap to the cover part after mounting the back cap to the opening to come into close contact with the lens.

Preferably, the fixing the back cap to the cover part is configured to fasten the back cap to the cover part in a threaded manner.

Preferably, after fixing the back cap to the cover part, one side of the lens comes into close contact with the lens guide, and the other side of the lens comes into close contact with the back cap.

Preferably, the fitting the O-ring into the groove is configured such that the O-ring is mounted between the protrusion of the lens guide and the opening.

Preferably, a first stepped portion is formed in the opening of the cover part, and a second stepped portion is formed on an outer circumference of the back cap, so that when the back cap is fixed to the opening, the first stepped portion is engaged with the second stepped portion.

Preferably, the lens includes a projecting portion, and the back cap includes a depression to be engaged with the projecting portion, so that when the back cap is fixed to the opening of the cover part, the projecting portion of the lens is securely inserted into the depression of the back cap.

Advantageous Effects of Invention

The camera module of the present invention is advantageous in that an assembly process can be simplified and the number of parts can be reduced by installing a lens in a cover part and fixing the lens with a back cap.

Further, the camera module of the present invention is advantageous in that a back cap is fastened to a cover part in a threaded manner, thus making an assembly process simple.

Furthermore, the camera module of the present invention is advantageous in that it is assembled in a single direction, thus shortening assembly time.

MODE FOR THE INVENTION

Hereinafter, embodiments of the present invention will be described with reference to the accompanying drawings.

Figure 1:
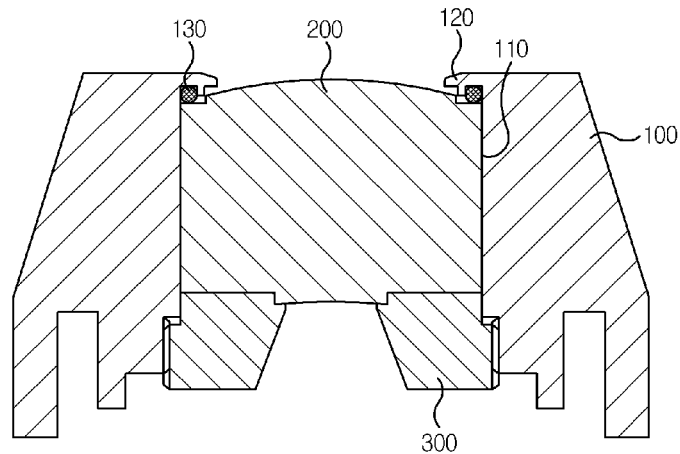
FIG. 1 is a schematic sectional view illustrating a camera module in accordance with an exemplary embodiment of the present invention.

FIG. 1 is a schematic sectional view illustrating a camera module in accordance with an exemplary embodiment of the present invention.

The camera module according to the present invention includes a cover part 100, a lens 200, and a back cap 300. An opening 110 is formed in the cover part 100, and a lens guide 120 is formed in the opening 110. The lens 200 is installed in the opening 110 of the cover part 100. The back cap 300 is brought into close contact with the lens 200 and is installed in the opening 110.

Here, the lens guide 120 prevents the lens 200 from moving out of the cover part 100.

Further, the lens guide 120 is formed on an inner wall of the opening 110 to block a portion of the opening 110 and thereby prevent removal of the lens 200 from the opening 110.

That is, the lens guide 120 takes a shape of a ring, and a width of the lens guide 120 is smaller than that of the opening 110, so that the removal of the lens 200 from the opening 110 is prevented by the lens guide 120.

Further, the lens guide 120 defines a width of an optical path of a subject incident into the lens 200.

Further, the lens guide 120 may be integrated with the cover part 100 into a single structure.

For example, the cover part 100 may be formed into a shape having the lens guide 120 thereon. In this way, the integration of the lens guide 120 and the cover part 100 may be implemented.

Further, an O-ring 130 may be interposed between the lens 200 and the cover part 100.

The O-ring 130 prevents moisture and a pollution source from entering between the lens 200 and the cover part 100.

Moreover, the back cap 300 is fixed to the cover part 100 using an additional fastening means or fixing means.

Various fastening means or fixing means may be applied to fix the back cap 300 to the cover part 100.

As such, one side of the lens 200 is inserted into the opening 110 of the cover part 100 to be in close contact with the lens guide 120, while the other side of the lens 200 is in close contact with the back cap 300. Thereby, the lens 200 is fixed to the cover part 100, so that optical alignment of the lens 200 is realized.

As described above, the camera module of the present invention is advantageous in that the lens is installed in the cover part and is fixed by the back cap, so that an assembly process can be simplified and the number of parts can be reduced.

Figure 2:
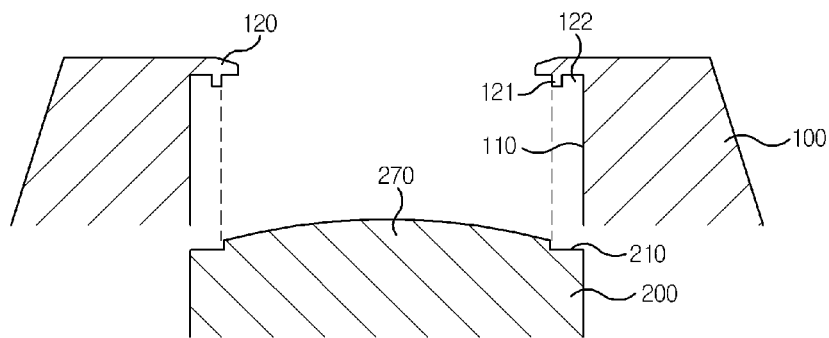
FIG. 2 is a schematic sectional view illustrating a part of the camera module in accordance with the embodiment of the present invention.

FIG. 2 is a schematic sectional view illustrating a part of the camera module in accordance with the embodiment of the present invention.

In the camera module of this embodiment, a protrusion 121 is provided on the lens guide 120 formed in the opening 110 of the cover part 100 to be in close contact with the lens 200.

Here, the protrusion 121 protrudes vertically from the lens guide 120 toward the lens 200.

Further, a surface of the lens 200 facing an object may be defined as an "object side" while a surface of the lens 200 facing an image sensor may be defined as an "image-sensor side".

Here, the camera module according to the present invention may have a stepped portion 210 along an edge of the object side of the lens 200.

That is, the protrusion 121 comes into contact with the stepped portion 210, thus allowing the lens 200 to come into close contact with the lens guide 120.

The object side of the lens 200 has a lens portion 270 which is spaced apart from the edge of the lens 200, and the protrusion 121 of the lens guide 120 comes into close contact with the edge of the object-side of the lens 200.

Further, a groove 122 is formed between the protrusion 121 of the lens guide 120 and the cover part 100, and an O-ring (not shown) is fitted into the groove 122.

In other words, the O-ring is fitted between the protrusion 121 of the lens guide 120 and the opening 110.

Figure 3:
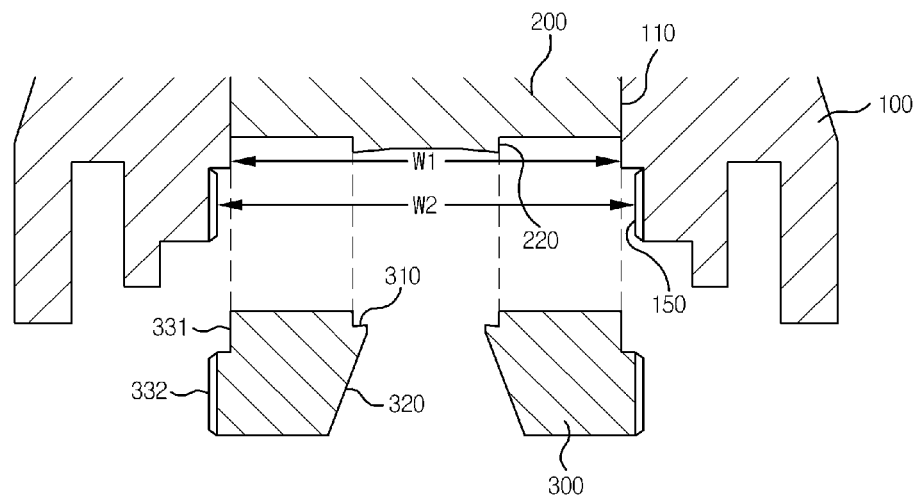
FIG. 3 is a schematic sectional view illustrating a part of the camera module in accordance with the embodiment of the present invention.

FIG. 3 is a schematic sectional view illustrating a part of the camera module in accordance with the embodiment of the present invention.

The camera module according to the embodiment of the present invention is configured to smoothly mount the back cap 300 to the cover part 100.

That is, a first stepped portion (see FIG. 4) is formed in the opening 110 of the cover part 100 into which the back cap 300 is installed, and a second stepped portion (see FIG. 4) is formed on an outer circumference of the back cap 300. Thereby, when the back cap 300 is inserted into the opening 110, the first stepped portion is engaged with the second stepped portion.

Here, the first and second stepped portions are shaped to be engaged with each other when the back cap 300 is coupled to the cover part 100.

Turning back to FIG. 3, a recess 150 is formed in the cover part 100, and the opening 110 of the cover part 100 is formed inside the recess 150.

Further, cover-part coupling portions 331 and 332 are formed on the outer circumference of the back cap 300, and are shaped to be engaged with the opening 110 and the recess 150 of the cover part 100, respectively.

Here, a width W1 of the opening 110 is narrower than a width W2 of the recess 150.

Further, according to other structural characteristics, a projecting portion 220 may be formed on the image-sensor side of the lens 200, and a depression 310 may be formed in the back cap 300 to be engaged with the projecting portion 220.

Therefore, when the back cap 300 is mounted to the opening 110 of the cover part 100, the projecting portion 220 of the lens 200 is inserted into the depression 310 of the back cap 300.

Further, a through hole 320 may be formed in the depression 310 of the back cap 300 to serve as a path into which light of a subject is incident.

Also, an IR filter and an image sensor are sequentially arranged on the back cap 300.

Furthermore, the light of the subject is incident into the image sensor via the through hole 320.

Figure 4:
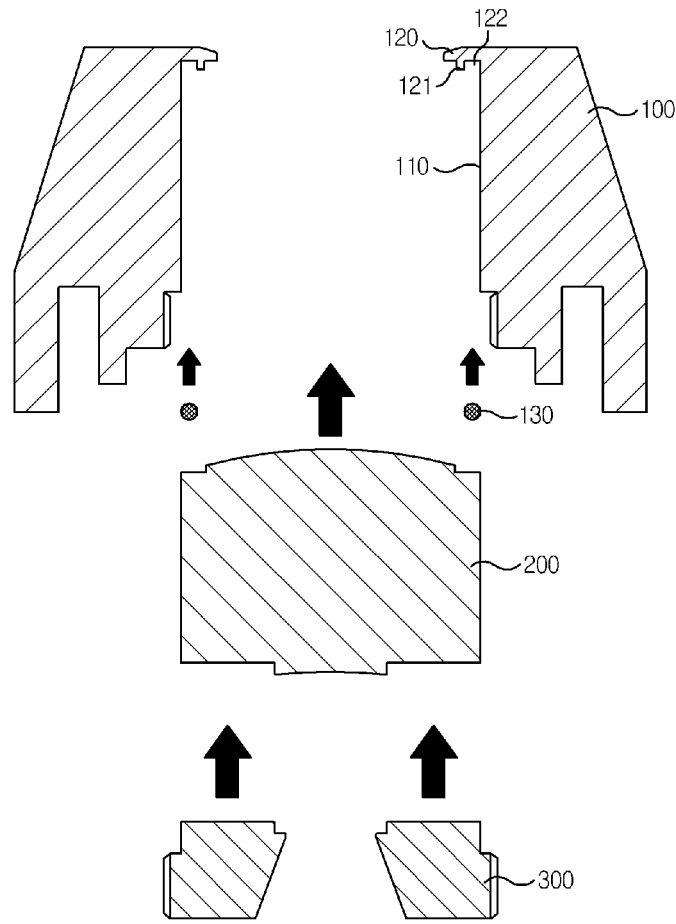
FIG. 4 is a schematic sectional view illustrating a method for assembling a camera module in accordance with an exemplary embodiment of the present invention.

FIG. 4 is a schematic sectional view illustrating a method for assembling a camera module in accordance with an exemplary embodiment of the present invention.

The method for assembling the camera module according to the present invention first prepares the cover part 100. The opening 110 is formed in the cover part 100, and the lens guide 120 is formed in the opening 110 to prevent the removal of the lens 200 to the outside, and the protrusion 121 is formed on the lens guide 120 to come into close contact with the lens 200, and the groove 122 is formed between the protrusion 121 of the lens guide 120 and the cover part 100.

Next, the O-ring 130 is fitted into the groove 122.

Subsequently, the lens 200 is mounted to the opening 110 so that the lens 200 comes into close contact with the O-ring 130.

Further, after the back cap 300 is mounted to the opening 110 to come into close contact with the lens 200, the back cap 300 is fixed to the cover part 100.

As such, the camera module of the present invention is advantageous in that the number of assembly parts is small and the assembly process is simple, so that a manufacturing cost is reduced.

Further, the camera module of the present invention is advantageous in that the assembly is performed in a single direction, so that assembly time can be shortened.

Figure 5:
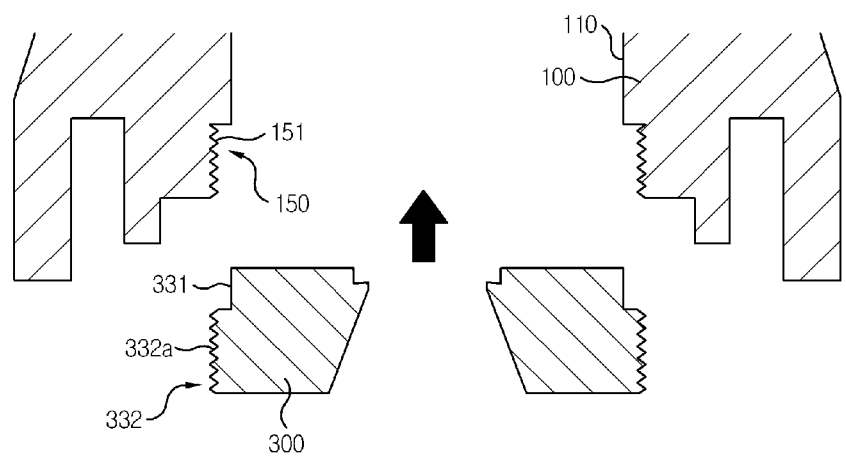
FIG. 5 is a schematic partial sectional view illustrating an example of a method for fastening a back cap to a cover part of the camera module in accordance with the embodiment of the present invention.

FIG. 5 is a schematic partial sectional view illustrating an example of a method for fastening the back cap to the cover part of the camera module in accordance with the embodiment of the present invention.

There are various methods for fixing the back cap 300 to the cover part 100, and FIG. 5 shows one example of the methods.

That is, the recess 150 is formed in the cover part 100, and the opening 110 is formed inside the recess 150.

Further, the cover-part coupling portions 331 and 332 engaging with the opening 110 and the recess 150 of the cover part 100 are formed on the outer circumference of the back cap 300. A first threaded portion 151 is formed on an inner surface of the recess 150, while a second threaded portion 332a is formed on the outer circumference of the back cap 300 to be engaged with the first threaded portion 151.

Here, the back cap 300 is provided with an area inserted into the opening 110 of the cover part 100, and an area inserted into the recess 150 of the cover part 100.

Thus, if the back cap 300 is inserted into the opening 110 of the cover part 100 and thereafter the back cap 300 is rotated, the first threaded portion 151 is engaged with the second threaded portion 332a.

Therefore, the present invention is advantageous in that the back cap is fastened to the cover part in a threaded manner, so that the assembly process can be simplified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a camera module, which is capable of simplifying an assembly process and reducing the number of parts by installing a lens in a cover part and fixing the lens with a back cap.

The invention claimed is:

1. A camera module, comprising:
    a cover part having an opening;
    a lens mounted to the opening of the cover part, the lens including a downward stepped portion formed on an edge of an upper surface of the lens;
    a lens guide formed in the opening at an upper portion of the cover part to prevent removal of the lens;
    a protrusion protruded from a portion of the lens guide toward the lens; and
    a back cap coming into close contact with the lens and mounted to the opening,
    wherein the protrusion is coupled to the downward stepped portion, and
    wherein a recess is formed in the cover part, the opening is formed inside the recess, and cover-part coupling portions are formed on the outer circumference of the back cap to be engaged with the recess and the opening of the cover part.

2. The camera module as set forth in claim 1, wherein the lens guide is integrated with the cover part into a single structure.

3. The camera module as set forth in claim 1, wherein an O-ring is interposed between the downward stepped portion of the lens and the cover part.

4. The camera module as set forth in claim 1, wherein the back cap is fixed to the cover part.

5. The camera module as set forth in claim 1, wherein a portion of the upper surface of the lens is in close contact with the lens guide, and a portion of a bottom surface of the lens is in close contact with the back cap.

6. The camera module as set forth in claim 1, wherein an O-ring is mounted between the protrusion of the lens guide and the opening.

7. The camera module as set forth in claim 1, wherein a first stepped portion is formed in the opening of the cover part, and a second stepped portion is formed on an outer circumference of the back cap, so that when the back cap is mounted to the opening, the first stepped portion is engaged with the second stepped portion.

8. The camera module as set forth in claim 1, wherein a width of the opening is narrower than a width of the recess.

9. The camera module as set forth in claim 1, wherein the lens includes a projecting portion on a bottom surface of the lens, and the back cap includes a depression to be engaged with the projecting portion, so that when the back cap is mounted to the opening of the cover part, the projecting portion of the lens is inserted into the depression of the back cap.

10. The camera module as set forth in claim 1, wherein the back cap is fastened to the cover part in a threaded manner.

11. The camera module as set forth in claim 9, wherein a through hole is formed in the depression of the back cap.

12. A method for assembling a camera module, comprising:
    preparing a cover part, the cover part including an opening, a lens guide formed in the opening at an upper portion of the cover part to prevent removal of a lens, a protrusion protruded from a portion of the lens guide towards the lens, and a groove formed between the protrusion of the lens guide and the cover part;
    fitting an O-ring into the groove;
    mounting the lens to the opening so that a downward stepped portion on an edge of an upper surface of the lens comes into close contact with the protrusion; and
    fixing the back cap to the cover part after mounting the back cap to the opening to come into close contact with the lens,
    wherein a recess is formed in the cover part, the opening is formed inside the recess, and cover-part coupling portions are formed on the outer circumference of the back cap to be engaged with the recess and the opening of the cover part.

13. The method as set forth in claim 12, wherein fixing the back cap to the cover part is configured to fasten the back cap to the cover part in a threaded manner.

14. The method as set forth in claim 12, wherein after fixing the back cap to the cover part, a portion of the upper surface of the lens is in close contact with the lens guide, and a portion of a bottom surface of the lens is in close contact with the back cap.

15. The method as set forth in claim 12, wherein the O-ring is mounted between the protrusion of the lens guide and the opening.

16. The method as set forth in claim 12, wherein a first stepped portion is formed in the opening of the cover part, and a second stepped portion is formed on an outer circumference of the back cap, so that when the back cap is fixed to the opening, the first stepped portion is engaged with the second stepped portion.

17. The method as set forth in claim 12, wherein the lens includes a projecting portion on a bottom surface of the lens, and the back cap includes a depression to be engaged with the projecting portion, so that when the back cap is fixed to the opening of the cover part, the projecting portion of the lens is securely inserted into the depression of the back cap.

\* \* \* \* \*